United States Patent [19]

Cannon, Jr.

[11] 3,926,434
[45] Dec. 16, 1975

[54] REMOTE CONTROLLED VEHICLE SYSTEMS

[75] Inventor: Thomas C. Cannon, Jr., Dunwoody, Ga.

[73] Assignees: Thomas C. Cannon, Jr., Dunwoody, Ga.; Brent E. Coy, Morristown, N.J.; part interest to each

[22] Filed: Apr. 19, 1974

[21] Appl. No.: 462,334

[52] U.S. Cl. .............................. 273/86 B; 46/244 A
[51] Int. Cl.² .......................................... A63H 18/12
[58] Field of Search ....... 46/243 M, 243 LV, 244 R, 46/244 A; 191/2/13; 273/86 B

[56] References Cited
UNITED STATES PATENTS

| | | | |
|---|---|---|---|
| 3,339,307 | 9/1967 | Floyd et al. | 46/244 R |
| 3,596,401 | 8/1971 | Camire | 46/244 R |
| 3,686,447 | 8/1972 | Takalo | 46/244 A |
| 3,774,340 | 11/1973 | Barlow | 46/244 A |
| 3,780,235 | 12/1973 | Deyerl | 46/243 LV |
| 3,813,812 | 6/1974 | Barlow | 46/244 R |

Primary Examiner—Louis G. Mancene
Assistant Examiner—Robert F. Cutting
Attorney, Agent, or Firm—Martha G. Pugh, Esq.

[57] ABSTRACT

Self-propelled vehicles are controlled to move over an energized track by multichannel power control. The disclosed systems are particularly adapted for model cars.

The track comprises a repetitive pattern including at least two sets of conductors, respectively connected to opposite terminals of a remotely controlled source of power, preferably raised relative to intervening conducting means. Each controlled vehicle contains contacting means constructed to relate exclusively to a specific set of conductors. One contacting means may comprise an elongated member constructed to contact two or more raised conductors without contacting intervening conductors, which are simultaneously contacted by narrow members. Each vehicle includes a pair of electrically isolated motors, independently connected to operate opposite driving wheels of the vehicle, the direction of the vehicle depending on the difference in speeds of opposite wheels. The wheel driving circuits are uniquely responsive to separately controlled signals to direct the vehicles.

In several embodiments in which two vehicles respond to oppositely phased control signals, the driving circuits include avalanche breakdown devices triggered at a preselected control voltage to control the speed of one or the other of the driving wheels. In one embodiment, the control circuit generates voltage spikes timed to trigger an avalanche breakdown device controlling the vehicle direction.

In another embodiment, a depressed track conductor is segmented to conform to the number of vehicles in the system. Two motors in each vehicle are separately responsive to oppositely phased signals for direction control.

23 Claims, 28 Drawing Figures

REMOTE CONTROLLED VEHICLE SYSTEMS

BACKGROUND OF THE INVENTION

This relates in general to vehicles electrically driven by power from a remote source and, more particularly, to miniature self-propelled vehicles under control of a multichannel power input system.

The prior art discloses numerous systems, particularly related to miniature cars and trains, which are adapted to provide power from a remote source to control the direction and speed of one or more vehicles moving along a prescribed course. The problem is simplified in the case of electrical trains because of the fact that the wheels are shaped to mechanically engage the rails which determine the direction of travel; and, power is transmitted by brush contact with a trolley or third rail. In the case of miniature cars, the problem is complicated by the need to provide the vehicles with more freedom of direction on the track surface, while maintaining the control contacts and providing a relatively unobstructed path around the track. A further complication results from the need to provide at least one vehicle, and possibly each of a fleet of vehicles, with independent signals for control of speed and direction.

SUMMARY OF THE INVENTION

It is a principal object of this invention to provide simpler, more economical systems for remotely controlled vehicles which are electrically propelled by power derived through contacting means while the vehicles move along the track surface.

Another object of the invention is to provide one or more systems designed to remotely control the speed and direction of miniature vehicles so that they move over a conducting track surface smoothly and with minimum interference.

Another object of the invention is to provide systems for the transmission and reception of a plurality of independent signals for the control of vehicles traveling on an electrically conducting track without resort to multiplexing.

These and other objects are realized in accordance with the present invention in a system for driving one or more miniature vehicles from an alternating current source along a remotely controlled path on a conducting surface.

A feature common to each of the embodiments of the present invention is a conducting track having a series of raised conductors connected together to one terminal of a source of power and one or more intervening conductors which are connected together to an opposite terminal of the power source. Each of the miniature vehicles is equipped with a dual set of track contactors, one of which is designed to make contact exclusively with the raised conductors, and the other exclusively with the intervening conductors.

In each vehicle, driving means are connected between the intake and return contactors so that when the vehicle is simultaneously in contact with both a raised conductor and a depressed conductor on the track, power is derived from the source.

Assuming the power source to be of alternating current, the number of channels subject to separate control is increased by powering one of the motors in the receiving vehicles off of the positive signal portion and another motor in the receiving vehicles off of the negative signal portion. The two halves of the signal are separated by diode rectifiers and the amplitudes of the positive and negative components controlled independently by means of variable resistors in the signaling circuit. The respective motors controlled by the oppositely polarized signals may be in two separate vehicles or, alternatively, they may serve to operate opposite wheels of a single vehicle, thereby permitting both speed and directional control.

In a preferred embodiment, the circuits in two separate vehicles are arranged to receive rectified signals of opposite polarity from the control source, the respective voltage amplitudes of which determine the relative speeds of the driving motors in each of the vehicles. A pair of motors in each vehicle are independently connected to power driving wheels on opposite sides. If the two motors drive the opposite wheels at the same speeds, the vehicle will move straight ahead; whereas, an imbalance between the speeds of the two wheels will cause the vehicle to turn.

This type of control is accomplished by having the two motors in each vehicle connected substantially in parallel in independently controlled relation in a unidirectional circuit across the source of power between the input and return contacts of the vehicles. A first one of the motors is responsive to run at a relatively low voltage driving signal; and, the second motor, which is initially inoperative, is disposed in series with an avalanche breakdown rectifier which is only triggered at a relatively high voltage signal. This may take the form of a spike imposed on top of the driving voltage. Depending on where in the cycle the spike is injected, the second motor can be made to run faster, equal to or slower than the first motor.

A pair of hand control circuits connected between the control voltage source and the track conductors each contain avalanche breakdown devices which are triggered by discharge of a condenser to produce the oppositely poled voltage spikes which provide directional control in each of the vehicles. In each control circuit, the setting of a rheostat determines at what point the spike is interposed into the circuit and, hence, the direction of the respective vehicle. Another rheostat in each half of the control circuit sets the control voltage and, hence, the speed of each vehicle.

In another embodiment, each of two vehicles sharing the same two sets of conductors are also powered by oppositely poled alternating current signals. In this modification, the avalanche breakdown devices which power motors controlling opposite vehicle wheels are respectively triggered at different control voltages without relying on spikes transmitted from the control circuit.

In a further modified form of the invention, using a similar track arrangement to that previously described, a control circuit is provided for separately controlling the speed and direction of each of a pair of self-propelled miniature vehicles by using variations in the voltage amplitude and power amplitude of the control signals.

In another arrangement, each of the two motors in a single vehicle is respectively connected between the track contacting means by electrically isolated circuits of opposite polarity designed to respond to the oppositely polarized components of the control signals from the track. The motors are separately connected to drive wheels on opposite sides of the vehicle, the amplitude of the oppositely polarized signals being controllable by separate rheostats connected to the alternating current source. This system may readily be modified to operate with two or more vehicles by interposing, between the elevated conductors of the first set, an additional set of track conducting strips corresponding to each additional vehicle. The alternating current source is connected at the elevated track conductors and at the depressed terminals through a pair of unidirectional circuits of opposite polarity, each with a controlling rheostat. Each added vehicle is equipped with a broad contacting member disposed to contact the elevated grounded conductors whenever the narrow members contact a specific set of depressed strips of opposite polarity. Thus, a system may be constructed in accordance with this embodiment which has self-propelled electrically driven vehicles under control of N separate pairs of isolated control channels.

Other objects, features and advantages of the invention will be apparent to those skilled in the art from a study of the detailed specification hereinafter with reference to the attached drawings.

DETAILED DESCRIPTION

Figure 1:
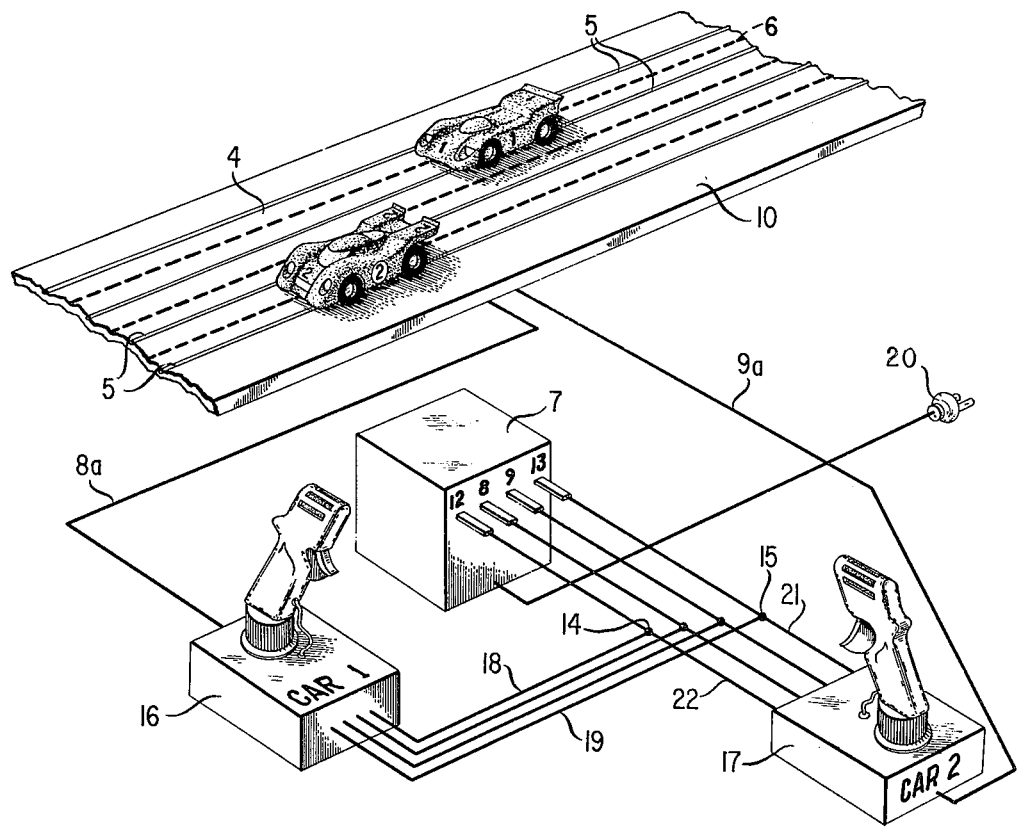
FIG. 1 is an overall showing of a self-propelled miniature vehicle system in accordance with the present invention, including two vehicles assembled on a track section with the control mechanisms indicated.
Figure 2:
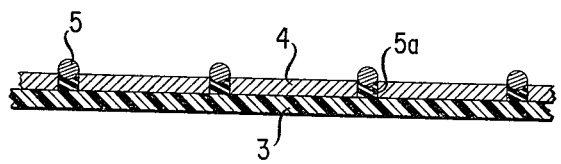
FIG. 2 is a showing, in section, of the track of FIG. 1.

FIG. 1 of the drawings illustrates a preferred embodiment of the invention, adapted to control the speed and direction of a pair of miniature vehicles 1 and 2 to move around a track 10, which in the present illustration is an oval 8 feet long and 4 feet wide. The track, which is shown in section in FIG. 2, comprises an insulating base structure 3, which may be hard rubber or some type of plastic, on which has been superimposed a conducting coating 4. In the present example, this comprises a layer of copper foil 0.01 inch thick, which is bonded or otherwise secured to the insulating substrate. Any other good conductor having good wearing qualities may be substituted. Superposed on the conducting surface 4 at equal lateral separations of, say, 1 inch, are a plurality of raised conductors 5 comprising copper wires about 0.015 inch in diameter, which are shaped to follow the contour of the board. These are mounted on underlying insulating strips 5a which serve to raise them up about 0.020 inch above the surface of the board. Electrical power is transmitted to the track 10 from a master control circuit 7 which includes a conventional transformer which is powered from any conventional alternating current source through the plug 20.

Raised conductors 5 are connected together to terminal 8a of control circuit 16 and conducting surface 4 is connected to terminal 9a. Terminals 8 and 9 are, respectively, flanked by another pair of terminals 12 and 13, and all are connected to the directional control members 16 and 17. Control circuits 16 and 17 are each connected through oppositely poled unidirectional circuits so that each circuit is responsive to one-half of the alternating current signal, as will be described presently.

Figure 4:
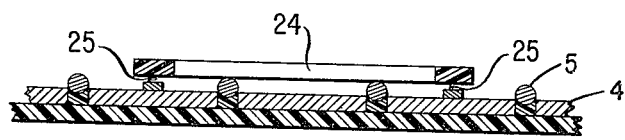
FIG. 4 is a cross-sectional showing of the contactors of FIG. 3A, engaging the conducting members of the track of FIG. 2.
Figure 3A:
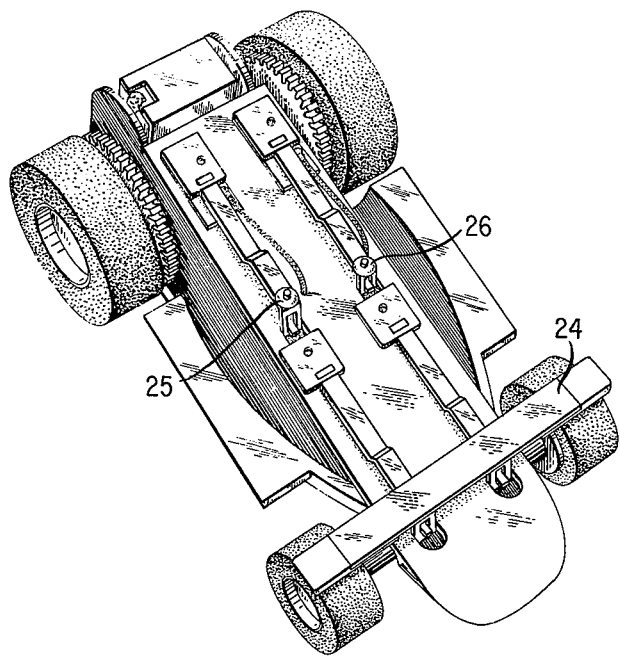
FIG. 3A is a perspective showing of one form of vehicle contactors on the under side of a vehicle.
Figure 3B:
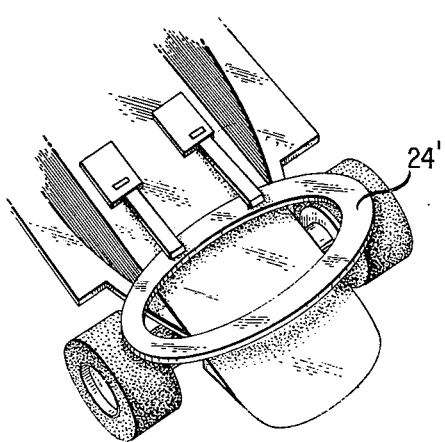
FIG. 3B shows an alternative form of vehicle contactor.

Each of the miniature vehicles 1 and 2, in addition to having two driving wheels, is equipped on its under surface with two pairs of electrical contactors, which may be of the shapes shown in FIG. 3A or FIG. 3B of the drawings. Referring to FIG. 3A, one of these contactors, 24, is an elongated conducting bar which exceeds in length the lateral distance between two adjacent conductors 5. Another pair of contactors 25 and 26 are each sufficiently small in lateral extent so that they fit between pairs of raised conductors, making contact only with conducting surface 4, as illustrated in FIG. 4, which is a cross-sectional showing of the contacts in mating relation with the track. All of the contactors are preferably of copper or other good conductor and are suspended by small coil springs from the lower surfaces of the respective vehicles so that they are free to move only in a vertical direction. The small contacting members 25 and 26 are so designed, being supported on leaf springs, that they can move over the raised conductors, permitting a vehicle to move laterally over the track to the left or right as well as in a forward direction around the track. It will be understood that raised conductors 5 can be specially shaped, say, trapezoidally, to facilitate the lateral movement of the vehicles. It will be understood that the contactors can assume alternative forms. For example, the extended contactor can assume the form of a circular or elliptical annulus 24', as indicated in FIG. 3B of the drawings, or, in fact, any other form which permits contact with raised conductors 5 without making contact with the depressed conductors 4.

It will be seen from FIG. 4 that contactors 24, 25 and 26 are so shaped that when 24 engages a pair of conductors 5 in electrical contacting relation, at least one of conductors 25 or 26 is in contact with conducting surface 4.

It will be apparent that in the system under discussion, each of miniature vehicles 1 and 2 is powered from the same source. In order to permit the vehicles to be separately controlled so that they may each traverse the track in an arbitrary and independent fashion, the circuits in each are designed to respond to opposite halves of the alternating current cycle; and, the separate control units 16 and 17 are respectively designed to produce oppositely poled control signals so that one control set governs the speed and direction of one of the vehicles, whereas the other control set governs the speed and direction of the other vehicle.

In both of the control signal and receiving circuits 16 and 17, the two halves of the alternating current signal are separated by rectifying diodes, the amplitudes of which are controlled independently by means of variable resistors. Each of the vehicles 1 and 2 contains two motors, each connected to drive an opposite one of the back wheels of the specific vehicle. The voltage amplitudes determine the speeds of the driving motors in the vehicle. The larger the amplitude, the greater the overall speed of the vehicle.

The direction of the vehicle is determined by the relative speeds of the driving wheels on opposite sides and, hence, the motors connected to drive the respective wheels. One motor powers a driving wheel on one side of the vehicle while the other motor powers a driving wheel on the other side. Thus, if the motors run at the same speeds the vehicle will move straight ahead, whereas any imbalance will cause the car to turn.

Figure 5:
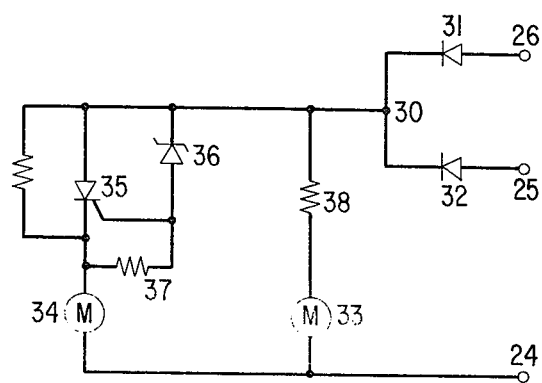
FIG. 5 shows the circuit for vehicle 1 in a preferred system of the present invention.

A preferred vehicle circuit in accordance with the present invention, which causes the two motors to run at variable speeds, is shown in FIG. 5. Terminal 24 represents the broad contactor which rides on raised neutral or ground conductors 5, whereas terminals 25 and 26 represent the narrow contacting members which ride on the intervening depressed conducting surfaces 5. Terminals 25 and 26 are connected through diodes 31 and 32 to junction 30. The two diodes 31 and 32, which are like directed, rectify the incoming alternating current signal.

A first motor 33, of, say, 0.0015 horsepower, is connected in series with 4.0 ohm resistor 38 between junction 30 and the neutral or ground contactor 24. A second motor 34, of the same horsepower as motor 33, is connected in series with an avalanche breakdown device 35 between junction 30 and neutral terminal 24. The device 35 preferably takes the form of a silicon controlled rectifier of the general character described with reference to FIG. 6.

Figure 6:
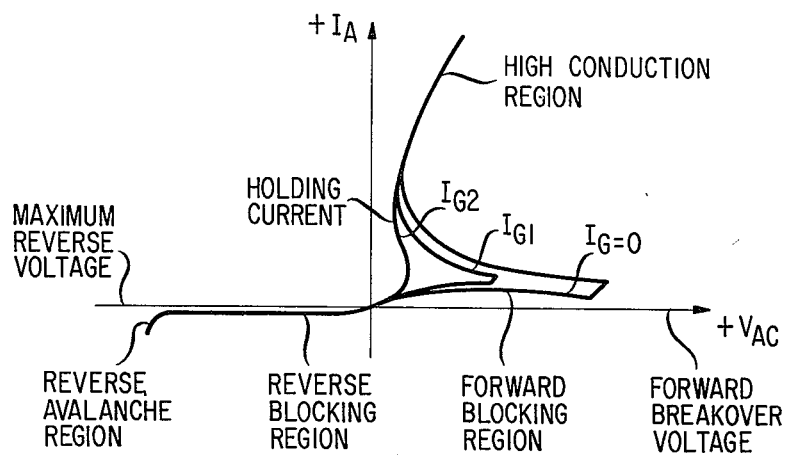
FIG. 6 is a graph of the current voltage characteristics for a typical silicon controlled rectifier of the type used in the circuits of the present invention.

FIG. 6 of the drawings illustrates the voltage current characteristics of a typical gate controlled p-n-p-n avalanche breakdown device suitable for the purposes of the present invention, in which avalanche current $I_A$ is plotted against avalanche voltage $V_{AC}$. In the forward blocking region, increasing the forward voltage does not tend to increase leakage current; until the point is reached at which avalanche multiplication begins to take place. Past this point, the leakage current increases quite rapidly until the total current through the device is sufficient to raise the internal loop gain to equal to or greater than one. At this point the device will go into the high conduction region, provided that anode current remains in excess of a minimum value called the "holding current." When anode current drops below the holding current, the p-n-p-n device reverts to its forward blocking state.

For increasing magnitudes of gate current, the region of characteristics between breakover current and holding current is narrowed and the forward breakover voltage is reduced. For sufficiently high gate currents, the entire forward blocking region is removed and the voltage current characteristics of a p-n-p-n device are essentially identical to those of a p-n semiconductor rectifier.

Once the gating means has been used to trigger a silicon controlled rectifier into conduction, it loses control; and the only method of turning this device off is to reduce anode current below the holding current level. Typically, a 10-to-50 microsecond gate pulse will initiate conduction in a gate controlled p-n-p-n switch. The time that elapses after the cessation of forward current flow, and before forward voltage may safely be reapplied, is called the "turn-off" time of the silicon controlled rectifier and is usually of the order of 10 to 15 microseconds long.

To act as a triggering circuit, a conventional zener diode 36 is connected with its negative terminal to the junction 30 and its positive terminal to the triggering electrode of the silicon controlled rectifier 35. The triggering circuit is completed by resistor 37, connected in a forward direction between the triggering electrode of the silicon controlled rectifier 35 and one terminal of motor 34.

In operation, after current from the control circuit is rectified by diodes 31 and 32, it passes through the balancing resistor 38, on through the motor 33 and out through the return contact 24. The amplitude of the driving signal is insufficient to trigger the gate on the silicon controlled rectifier 35. Consequently, motor 34 will ordinarily remain inoperative.

Figure 7:
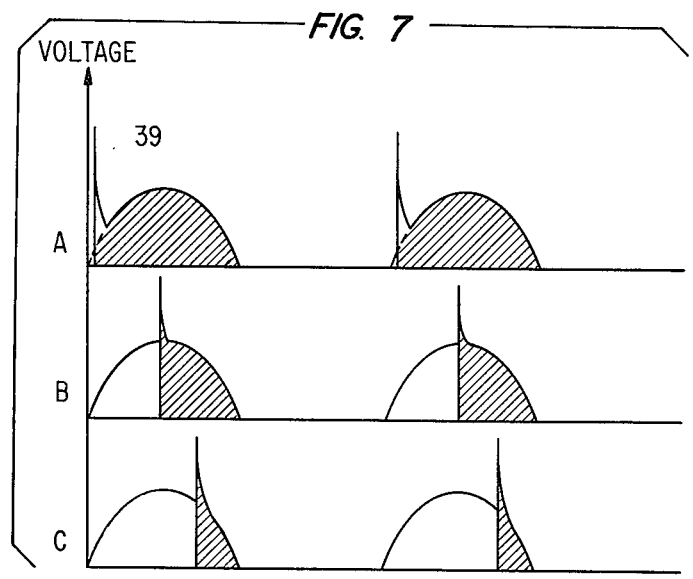
FIGS. 7A, 7B and 7C, respectively, show the voltage characteristics of a typical alternating current source and the control units for each of the two vehicles.

In accordance with a particular feature of the invention, motor 34 may indeed be made to run by imposing a "spike" 39 on top of the driving signal. (See, FIG. 7A). If of sufficient amplitude, this spike can overcome the output of zener diode 36 and trigger the silicon controlled rectifier 35 and, thus, allow the motor 34 to run. Depending on at what point in the cycle the spike 39 is injected, motor 35 can be made to run faster, equal to or slower than motor 33. FIGS. 7A, 7B and 7C are plots of voltage against time which depict a rectified alternating current with spike 39. The latter, which may exceed the alternating current peak by, say, 15 volts, is injected at various phases. The shaded regions of FIGS. 7A, 7B and 7C correspond to the times when motor 34 will run, in response to spike 39.

Figure 8:
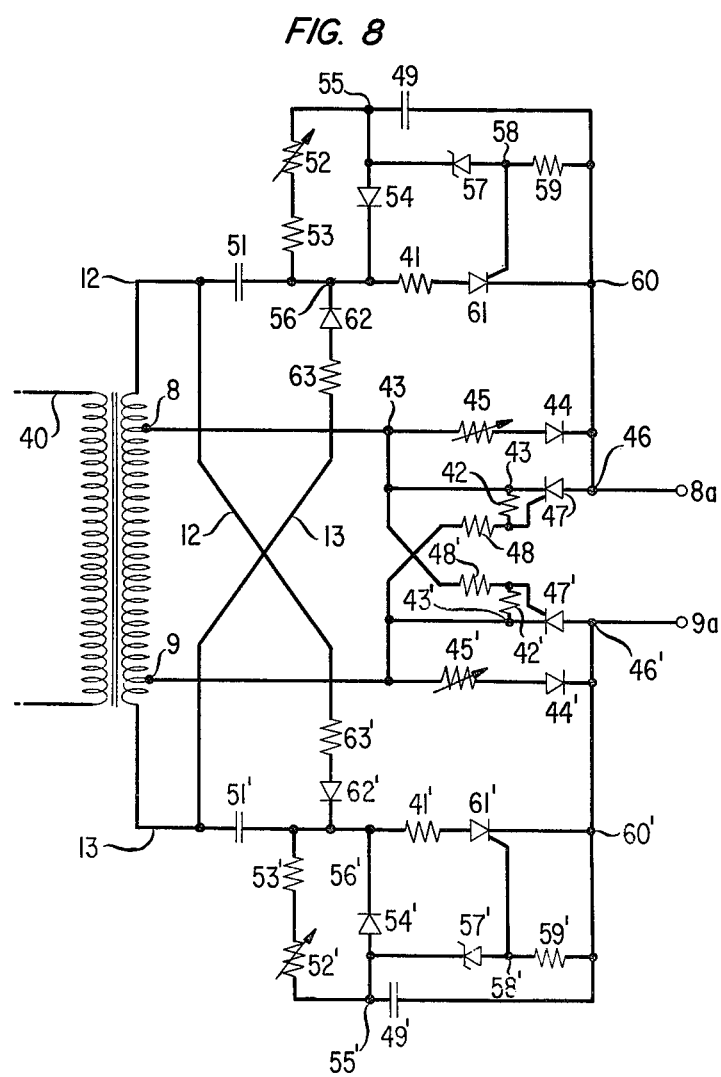
FIG. 8 is a schematic showing of the combined circuits for the control units for vehicles 1 and 2 in the preferred system.
Figure 9:
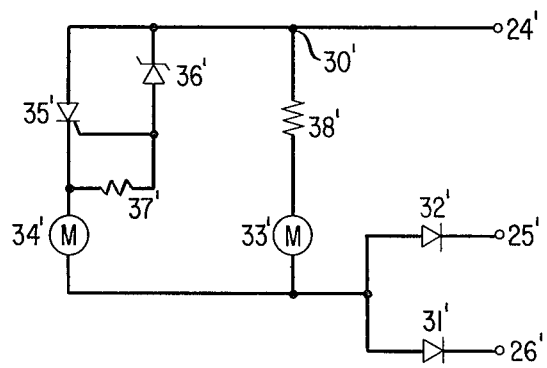
FIG. 9 is a circuit for vehicle 2 in the preferred system.

The spike generating device is contained in a signal control set, the circuit of which is shown in FIG. 8. This circuit is symmetrical about a horizontal line and may be thought of as consisting of two parts. The upper half of the circuit controls vehicle 1 and its two motors 33 and 34; whereas, the lower half controls corresponding motors in the vehicle 2, whose driving circuit is shown in FIG. 9, which represents the counterpart of the circuit of FIG. 5. In the latter, the polarities have been reversed, like elements being indicated by primed numbers.

As to FIG. 8, the top half, primarily, will be described, since the bottom half is identical, except for reversed polarities, and works in precisely the same way. In the upper and lower halves of the circuit, like elements will be indicated by primed numbers.

The driving votage for the vehicles is taken from the two center taps 8 and 9 of a four-tap alternating current transformer. The spike 39 is powered by the upper tap 12, while lower tap 13 powers its negative counterpart. Tap 8 is connected through junction 43 and 15 ohm variable resistor 45 in series with diode 44 and through junction 46 to terminal 8a. An avalanche breakdown device, which takes the form of a silicon controlled rectifier 47, is connected with its emitter to terminal 46 and its base to junction 43. The avalanche breakdown device 47 is connected for triggering through a circuit which leads from junction 43' through the 33,000 ohm resistor 48. Corresponding silicon controlled rectifier 47' is cross-connected to be triggered from junction 43. The 3,900 ohm resistor 42 provides a bias on the gate of silicon controlled rectifier 47.

Tap 12 is connected to the low potential plate of the 2.2 microfarad condenser 51. The high potential plate of the latter is connected to the 100,000 ohm varistor 52 through resistor 53. Both of the resistors 52 and 53 are shunted by diode 54 between junctions 55 and 56. Junction 55 is connected through the 12 volt zener diode 57 to junction 58, which is connected through resistor 59 to junction 60, which is connected to junction 46 at terminal 8a. The 0.1 microfarad condenser 49 is connected between terminals 55 and 60. The silicon controlled rectifier 61 is connected with its anode to one side of resistor 41 and its cathode to junction 60, and is arranged to be triggered from junction 58. The other side of resistor 41 is connected to junction 56. Junction 56 is connected through diode 62 and the 390 ohm resistor 63 to transformer tap 13 on the opposite side of the circuit, whereas junction 56' is cross-connected through a similar circuit to tap 12.

Operation of the circuit will now be described. Varistor 45 regulates the amplitude of the driving voltage, and diode 44 separates out the positive half of the signal. Capacitor 51 is initially charged up, producing a spike 39 (FIG. 7A) when capacitor 49 builds up to a high enough voltage to trigger the gate on silicon controlled rectifier 61, through which both 49 and 51 discharge. (See, FIGS. 7A, 7B and 7C). Variable resistor 52 regulates how fast the capacitor 49 builds up and, hence, at what point the spike 39 is injected on the driving signal. This determines the direction of the vehicle. The current passes through terminal 8a, on through the receiving circuit in vehicle 1, returning to terminal 9a and through silicon controlled rectifier 47'. The gate of silicon controlled rectifier 47' is rigged to be triggered when, and only when, terminal 8 is positive with respect to terminal 9. After passage through silicon controlled rectifier 47' the current feeds into the driving tap 9 on the opposite side of the transformer. During the negative half cycle capacitor 51 recharges through diode 62 and resistor 63. The process then repeats at the start of the positive half cycle.

Figure 10:
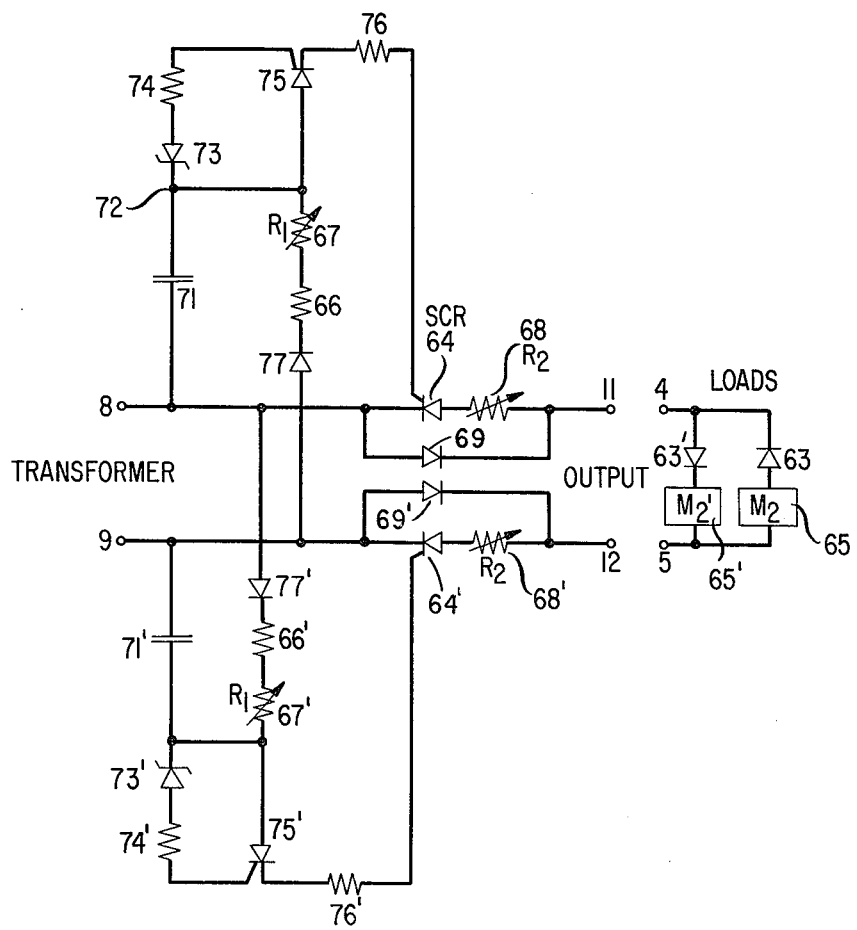
FIG. 10 is an alternative control circuit for the miniature vehicle system of the general type shown in FIG. 1.

It will be understood that numerous modifications to both the signal circuit and the individual miniature vehicle circuits are provided within the scope of the present invention. Instead of controlling the position of voltage spikes, as indicated in the circuit of FIG. 8, FIG. 10 of the drawings shows a modification of the signal control circuit in which the speed and direction in the miniature vehicles are respectively controlled by the voltage amplitude and the power amplitude. These parameters are independently controlled by separately varying the amplitude and frequency of pulses furnished to the vehicle circuits. These may share the same conductors, as in the previous embodiment. The circuits of vehicles 1 and 2, for example, may be substantially identical to the ones that appear in FIGS. 12 and 13.

FIG. 10 shows an electrical circuit diagram which may be used in substitution for the more sophisticated spike generating circuit of FIG. 8 for controlling the voltage amplitude and power transmitted to the motor loads 65,65' in the vehicles 1 and 2, sharing conductors 4 and 5 on the model track.

The input to the circuit, as in the previous embodiment, is through the center taps 8 and 9 of transformer 7, which is connected to a conventional alternating current source. The output of the control circuit of FIG. 10 is placed across the motor loads 65,65' of vehicles 1 and 2 on the track, through the contacts 11 and 12, which respectively lead to the elevated conductors 5 and the depressed conductors 4, as in the previous embodiment.

As in the case of the previously described embodiment, load 65 in vehicle 1 is connected in series with the rectifier diode 63 to respond only to the positive half of thee control signal; whereas, load 65' in vehicle 2 is connected in series with rectifier diode 63' to respond only to the negative half. It will be understood that 65 represents two different motors. Each motor responds to the power, but one motor, only, operates when the voltage is sufficiently high. The same applies for the two motors 65'. For convenience of description, primarily the positive half of the control circuit will be described, except where they intermesh inasmuch as the negative half is its mirror image, identical elements being indicated by primed designations.

The cathode of silicon controlled rectifier 64, which is identical to that described with reference to FIG. 6, is connected to transformer terminal 8, while the cathode of its counterpart 64' is connected to terminal 9. The anode of 64 is connected in series with 15 ohm variable resistor 68 to terminal 11; and, the anode of its counterpart 64' is connected through 15 ohm resistor 68' to terminal 12. Each of these circuits is shunted by an oppositely directed rectifying diode, 69 and 69', respectively. The silicon controlled rectifier 64 is triggered through the following circuit. A 5 microfarad capacitor 71 is connected to a junction 72 with the cathode of a conventional zener diode whose anode is connected in series with the 47,000 ohm resistor 74 to the triggering electrode of the silicon controlled rectifier 75, whose anode is connected to junction 72. The cathode of the silicon controlled rectifier 75 is connected through the 820 ohm resistor 76 to the triggering electrode of the silicon controlled rectifier 64.

Connected in series between junction 72 and transformer terminal 9 are a 100,000 ohm variable resistor 67, a 2700 ohm fixed resistor 66 and a rectifying diode 77. The correlative circuit from junction 72' is similarly connected to transformer terminal 8.

In operation, variable resistors 67 and 68 control the load 65 in vehicle 1; whereas, resistors 67' and 68' control the load 65' in vehicle 2. Resistor 67 determines the frequency of pulses transmitted to trigger the silicon controlled rectifier 64 in series with resistor 68. The frequencies of the pulses transmitted to trigger silicon controlled rectifier 64, in turn, determine the frequency with which power is applied to the load 65. The amplitude of the signal applied to the load 65 is determined by the setting of resistor 68.

The apparatus depicted in FIG. 10 thus permits the independent control of the power and voltage amplitude applied to each of the loads 65 and 65' in the vehicles 1 and 2. It will be apparent that loads 65 and 65' may be structured so that the voltage amplitude controls one function, such as the vehicle direction, whereas the power controls another function, such as vehicle speed. The circuit thus enables one to exercise control over two different loads 65 and 65', sharing the same conductors but individually varying their duty cycles and input voltages. The vehicles are of the form previously described with reference to FIGS. 1, 3A or 3B.

Figure 11:
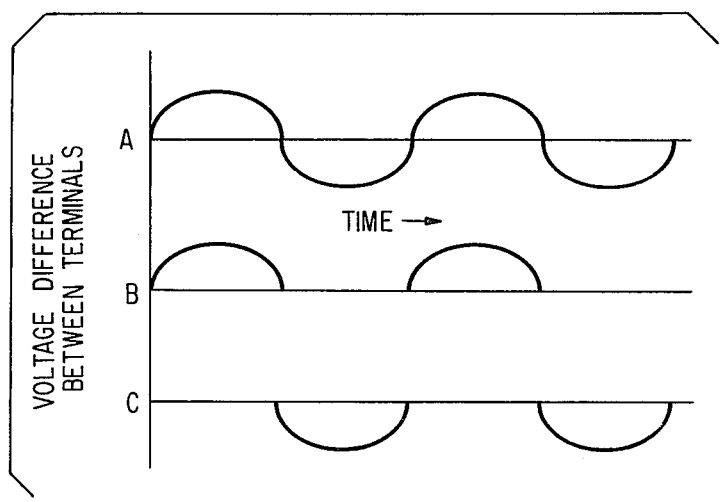
FIGS. 11A, 11B and 11C, respectively, show the voltage characteristic for the source and the oppositely polarized signals derived from the control circuit of FIG. 10.

Assume that the control signal system involves a simple connection across terminals 8 and 9 of transformer 7 (see, FIG. 1), a conventional alternating current signal is derived without the control spike furnished by the circuit of FIG. 8. This control signal is of the form indicated in FIG. 11A, the oppositely phased components of which may be separated, as indicated in FIGS. 11B and 11C. By providing the vehicle circuits 1 and 2 with contacting means including oppositely directed rectifying diodes, the motors of vehicles 1 and 2 can be operated across the same two conducting means, in a manner somewhat similar to the embodiment shown in FIGS. 5 and 9. Circuits specifically tailored for use with the circuit of FIG. 10 are shown in FIGS. 12 and 13.

Figure 13:
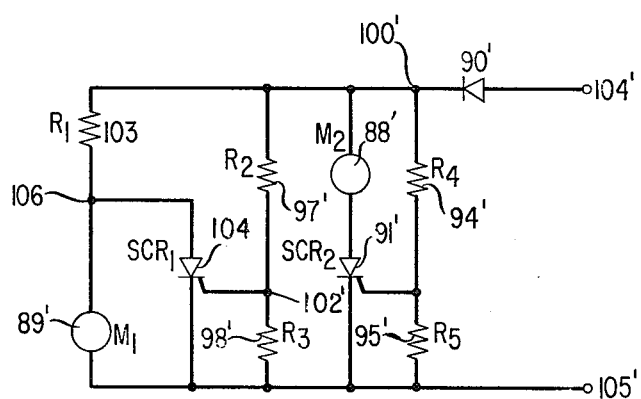
FIG. 13 shows a slight modification of the circuit of FIG. 12.
Figure 12:
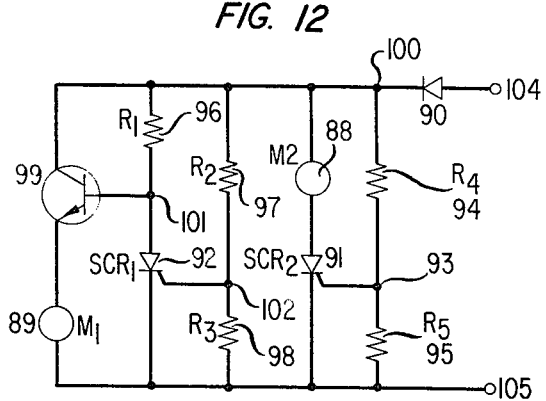
FIG. 12 shows the schematic of a modified circuit for vehicle 1 in accordance with a further alternative embodiment.

FIGS. 12 and 13 show two additional modifications of individual vehicle circuits, including two motors, each connected to the driving wheels of a respective vehicle for operating the wheels separately and controlling the direction of the vehicles by causing the wheels to operate at different rates. These circuits are designed so as to permit one motor to increase its speed with voltage increases, for the second motor to decrease its speed with voltage increases, and for some intermediate voltage to exist at which both motors operate at the same speed. With the systems shown in these two circuits, both speed and directional control of a vehicle is attained without reliance on the voltage spikes of FIG. 7 and assuming a control circuit of the type indicated in FIG. 10.

Referring to FIG. 12, the terminals 104 and 105 respectively represent the contacting means on one of the miniature vehicles, constructed to make contact on the track with the strip 4 and elevated conductor 5, respectively, as previously discussed. It will be understood that FIG. 12 represents an embodiment installed in miniature vehicle 1 and constructed to receive only the positive half of the signal transmitted by the control circuit of the form shown in FIG. 11B; whereas, a similar circuit installed in miniature vehicle 2, which is the mirror image of the circuit of FIG. 12, is constructed to receive only the negative half of the control signal, as shown in FIG. 11C.

The terminal 104 is connected through the rectifying diode 90 to terminal 100.

A first motor 88, of the order of 0.0015 horsepower, which is connected to the left-hand wheel of vehicle 1, is connected with one terminal to junction 100 and the other terminal to the anode of the silicon controlled rectifier 91, the cathode of which is connected to terminal 105. Silicon controlled rectifier 91 and its circuit companion 92, which will be discussed presently, are of the type described in detail with reference to FIG. 6 of the drawings.

Silicon controlled rectifier 91 is triggered from the junction 93 between 47,000 ohm resistor 94 and 5,600 ohm resistor 95, which are connected in series between junction 100 and terminal 105.

A second motor 89, which drives the left-hand wheel of vehicle 1 and is of the same horsepower as motor 88, is connected between the emitter of an n-p-n transistor 99 and terminal 105. The collector of n-p-n transistor 99 is connected to junction 100. The base of n-p-n transistor 99 is connected to junction 101 at one terminal of the 330 ohm resistor 96, whose other terminal is connected to junction 100. The second silicon controlled rectifier 92 is connected with its anode to junction 101 and its cathode to terminal 105. The triggering electrode of silicon controlled rectifier 92 is connected to junction 102 between the 47,000 ohm resistor 97 and the 3300 ohm resistor 98, which are connected in series between junction 100 and terminal 105.

The operation of the circuit depicted in FIG. 12 is as follows. At low voltages, both silicon controlled rectifiers 91 and 92 are nonconducting. Thus, motor 88 is prevented from running; and, since the n-p-n transistor 99 in series with motor 89 is in a conducting state, motor 89 will be permitted to run. The pairs of resistors 97, 98 and 94, 95 are scaled so that silicon controlled rectifier 91 begins to conduct at a lower voltage than that necessary to turn on silicon controlled rectifier 92. Accordingly, at some voltage, a condition will be reached where essentially both motors 89 and 88 are fully on. At higher voltages, silicon controlled rectifier 92 begins to conduct and, consequently, transistor 99 will be prevented from conducting. That portion of the cycle during which transistor 99 is off will increase with increasing voltage, thus slowing the speed of motor 89. At sufficiently high voltages, motor 89 will be nearly completely off, while motor 88 will be essentially entirely on.

The same effect is accomplished, but by a somewhat more direct means, in the circuit shown in FIG. 13.

The elements designated by primed numbers substantially correspond in structure and function to similar elements in the circuit of FIG. 12. The circuit of motor 88', in series with silicon controlled rectifier 91', is substantially similar to its counterpart in the earlier circuit. Motor 89', however, is connected in series with the 15 ohm resistor 103 between junction 100' and terminal 105'. Silicon controlled rectifier 109 is connected with its anode to the junction 106 between resistor 103 and motor 89' and its cathode to terminal 105'. The triggering electrode for silicon controlled rectifier 109 is connected to junction 102' between the 47,000 ohm resistor 97' and the 3300 ohm resistor 98', which are connected in series between junction 100' and terminal 105', as in the previous embodiment.

The operation of the silicon controlled rectifiers 109 and 91' and resistors 97', 98' and 94', 95' are all the same as the operation of corresponding components in FIG. 12. At low voltages neither of silicon controlled rectifiers 109 or 91' is conducting and, consequently, only motor 89' runs. At some intermediate voltage, silicon controlled rectifier 91' begins to conduct and motor 88' starts to catch up with motor 89'. At high voltages, silicon controlled rectifier 109 begins to conduct and, thus, shorts out motor 89' during a portion of the cycle. That portion of the cycle during which motor 89' is off increases with voltage and, thus, causes the speed of motor 89' to decrease with voltage.

An important advantage of the vehicle systems disclosed in FIGS. 12 and 13 may be found in the manner in which the relative speeds of the two motors are changed. Since one motor increases speed with voltage while the other decreases speed with voltage, the average speed of the two motors remains nearly constant. Accordingly, when such motors are used to power the right and left wheels of a vehicle, such as miniature vehicles 1 and 2 of FIG. 1, then the vehicles would have the capability of turning right or left without any apparent change in speed. This is in contrast to prior art systems in which one motor runs at nearly a constant speed while the other motor's speed varies with voltage. In such a prior art system, the average motor speeds would be quite different depending on whether a right turn or a left turn were being executed.

An additional variation of the systems previously disclosed is found in a multichannel system wherein a plurality of channels are transmitted from the control circuit operating through the electrically conducting track, which channels are used to control one or more functions in each of a plurality of vehicles.

For the purposes of illustration, a system will be disclosed in which isolated signals are transmitted and received over four channels, although it will be understood that the principles disclosed can be extended to an arbitrary number of vehicles and control channels, as will be explained hereinafter.

Figure 14:
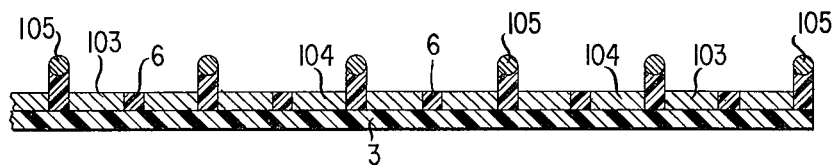
FIG. 14 shows a modification of the track structure indicated in FIG. 2 to accommodate the system in FIGS. 17-21.
Figure 18:
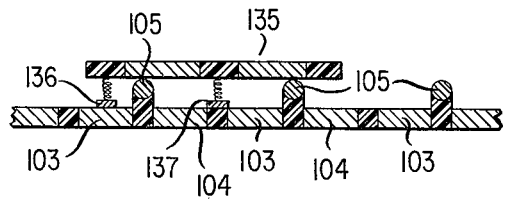
FIG. 18 is a sectional showing of the track of FIG. 16 engaged by modified vehicle contactors as used in the embodiment of FIGS. 17-21.

For the operation of the modified four-channel miniature vehicle system under description, it will be understood that the track shown in FIG. 1 of the drawings is also modified as shown in FIG. 14, with the vehicle contactors modified as indicated in FIG. 18. In addition to being equipped with the raised conducting members 5 (denoted 105 in FIG. 14), which are laterally spaced apart on the conducting surface 4, the latter will be divided along the dotted line 6 in FIG. 1, which represents an insulating divider, into two separate strips 103 and 104, which are aligned with conductors 105 so as to be parallel to the primary direction of travel of the vehicle. All conductors with like numbers are connected together. A section of track suitable for use with the present modified multichannel system is shown in FIG. 14 of the drawings.

Figure 15:
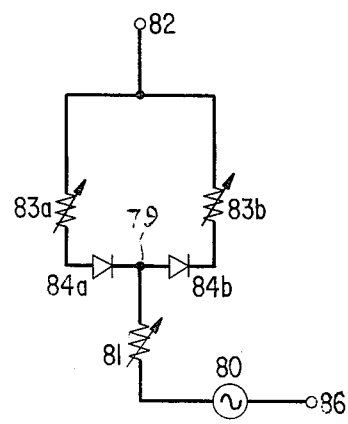
FIG. 15 is a schematic of a simplified control circuit of another alternative embodiment of the present invention.

FIG. 15 is a schematic showing of a simple control circuit for regulating both the relative amplitudes and absolute amplitudes of the positive and negative halves of the alternating current signal, thereby controlling the relative voltage to each of the vehicles. In this schematic, 80 represents the alternating current source, the neutral or ground terminal of which is connected to 86, which is connected to the raised conductors 5 on the track. The other terminal of source 80 is connected through variable resistor 81 to junction 79. The latter is connected to high potential terminal 82, through a pair of parallel circuits respectively including variable resistor 83a and rectifying diode 84a and variable resistor 83b and rectifying diode 84b. Diodes 84a and 84b are oppositely directed.

Figure 16:
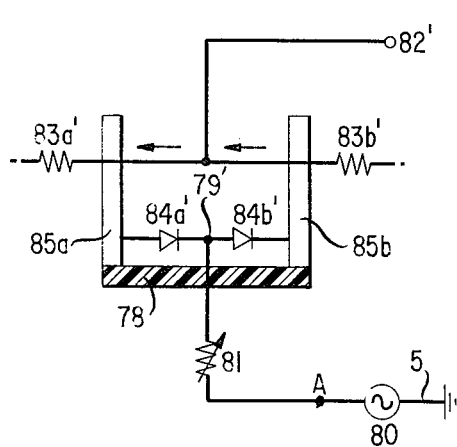
FIG. 16 is a partial schematic indicating the physical form of a contactor in accordance with FIG. 15.

FIG. 16 shows a special mechanism for regulating the relative positive and negative signal components.

As indicated with reference to FIG. 16, the alternating current signal source 80 (which may be across the terminals 8 and 9 of transformer 7 of FIG. 1), has one of its terminals connected to the grounded or neutral elevated conductors 5 on the track 1. As in the schematic circuit, the other source terminal is connected through the 20 ohm variable resistor 81 to a junction 79' which is anchored at the center of an insulating support 78 having a pair of extended conducting prongs 85a and 85b. Oppositely directed rectifying diodes 84a' and 84b' are connected from the junction 79' to each of prongs 85a and 85b, so that the negative half of the alternating current signal flows through one prong and the positive half flows through the other prong. As in the schematic, a pair of resistors 83a' and 83b' are connected in parallel from terminal 82' to ground. Each of the ganged prongs 85a and 85b rides in the manner of a potentiometer slider on a respective one of resistors 83a' and 83b'. The terminal 82' between 83a' and 83b' is connected to the conductor 4 on the track 1. By sliding the prongs 85a and 85b to the left or right along resistors 83a' and 83b', the relative magnitudes of the positive and negative alternating current components of the signal are determined.

Figure 17:
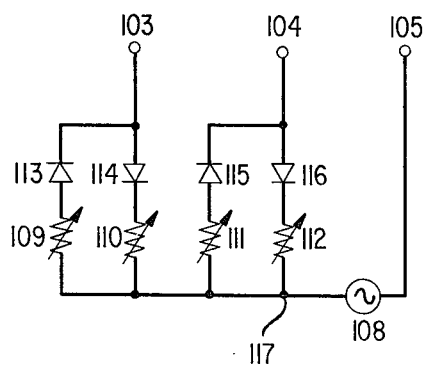
FIG. 17 is the schematic of the control circuit for a modified multichannel system in accordance with the present invention.

It will be seen that the circuit shown in FIG. 17 may be thought of as a composite of two FIG. 15 circuits.

It is contemplated that an alternating signal control set of the form disclosed in FIG. 17 will transmit four generated signals to the track. Each of the two vehicles 1 and 2 traversing the track will be equipped to respond to a pair of signals of opposite polarity, one of which governs the speed of one of its driving wheels, and the other of which governs the speed to the opposite driving wheel.

The circuit schematic of the control circuit is shown in FIG. 17. This includes an alternating current source 108, which may be derived across the terminals 8 and 9 of transformer 7, indicated in FIG. 1. One of the terminals of source 108 is connected to terminal 105, corresponding to the elevated conductors 5 on track 1. The other terminal 117 is connected to two pairs of parallel branches. Between junction 117 and terminal 103 are, respectively, connected a first branch comprising the variable resistor 109 in series with rectifying diode 113, and variable resistor 110 in series with diode 114. Diodes 113 and 114 are oppositely directed. The circuit between junction 117 and contactor 104 similarly comprises two parallel branches, variable resistor 111, in series with diode 115, and variable resistor 112, in series with diode 116. As in the other pair, diodes 115 and 116 are oppositely directed. Each of variable resistors 109, 110, 111 and 112 has a maximum value of about 20 ohms. The contactors and track are shown in cross-section in meshed contacting relation in FIG. 18. The elevated conductors 105 on the track are designed to receive the elongated contactors 135 on each of the vehicles. These are of similar types to the elongated contactor shown in perspective in FIG. 3A. Terminals 103 and 104, respectively, represent depressed track conductors on which narrow spring mounted contacts 136,137 are constrained to move in electrical contacting relation and which are so placed relative to the elongated contactor 135 that each of narrow contactors 136,137 is disposed to contact only a respective one of conducting strips 103 and 104 on track 1, when the broad contactors rest across a pair of adjacent elevated conductors 105.

Referring to the schematic control circuit shown in FIG. 17, variable resistors 109, 110, 111 and 112 control the power supplied between terminals 103 and 105 and 104 and 105. During one portion of the cycle, resistors 109 and 111 control the power, while for the other portion of the cycle resistors 110 and 112 control the power.

Assuming two loads in the form of vehicle motors are placed in parallel between pairs of terminals 103 and 105 and 104 and 105 respectively and if one motor responds only to positive voltages imposed on terminals 103 and 104 while the other responds only to negative voltages, then one may use resistor 109 to control the power delivered to one motor and resistor 110 to control the second motor. Similarly, one can use resistors 111 and 112 to control two other motors. Thus, by separating the positive and negative portions of the input signal and further dividing the signal along parallel paths, one has the capability of producing four independent amplitude signals. These signals are to be fed into the motor load circuits by way of conductors 103, 104 and 105 of track 1.

The circuits which receive the power transmitted by way of the track are shown in FIGS. 19A, 19B and 20A, 20B. Also, shown in these figures are the relative spatial positions of the electrical pick-up contacts. A description of the functioning of these circuits follows.

For reference to the manner of contact with the track, note FIG. 18. The contacts 135, which impinge upon the track, assume the form of a horizontal bar, as previously described with reference to FIGS. 3A and 3B of the drawings, and two vertically articulate pick-up points 136 and 137. As previously described, the dimensions of the bar 135 prevent it from making electrical contact with any conductor other than raised conductors 105. Also, in the previously described embodiments, the other two contacts 136 and 137, which are free to move vertically but not horizontally, may ride up and over the elevated conductors 105, and thus are capable of touching any portion of the track.

The areas with heavy line hatching appearing in all the figures are meant to represent electrical insulation; whereas the light line hatching indicates conducting areas. As is seen from the figures, the vertically moving contacts 136, 137 are always positioned beneath an insulated portion of the horizontal rod 135. The width of the conducting elements of the bar contact 135 is chosen to be equal to the combined width of the elevated conductor 105 and one of the lower conductors 103, 104. The width of the point contacts 136, 137 is selected to be less than the width of an insulation gap (FIG. 18).

Figure 19A:
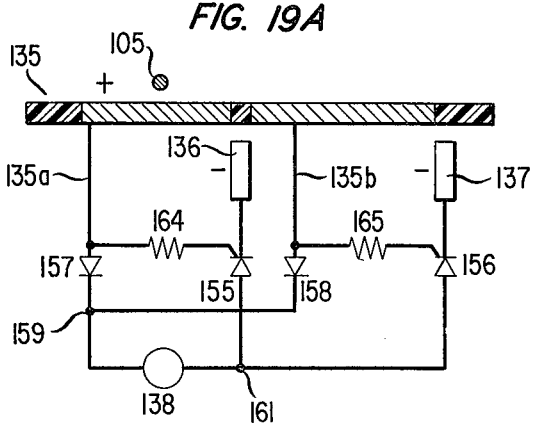
FIGS. 19A and 19B are respective schematic showings of two sections of the circuit of vehicle 1 in the multichannel system, the sections being shown separately for clarity of description.
Figure 19B:
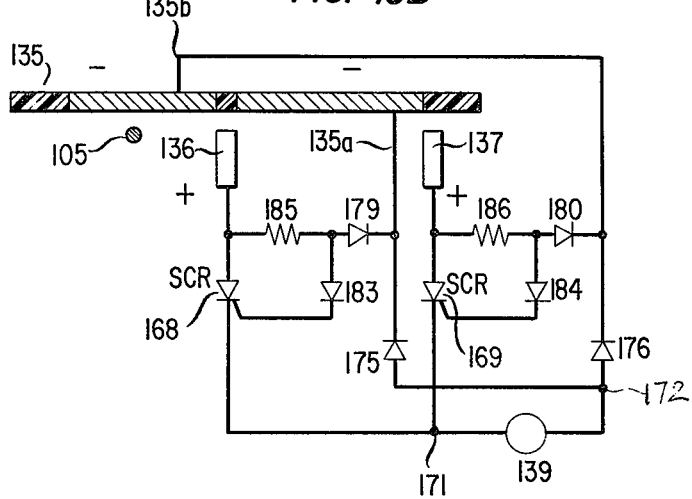

In FIGS. 19A and 19B the electrical circuit for a single vehicle 2 is shown in two parts in order to facilitate reading of the circuit. The portion of the circuit which influences the operation of motor 138 is shown in FIG. 19A and the portion of the circuit which controls the operation of motor 139 is shown in FIG. 19B. The two portions are electrically uncoupled; but, each is connected between broad contacting member 135 and the narrow high potential contactors 136 and 137.

Referring to FIG. 19A, broad contacting member 135 is connected through a conventional rectifying diode 157 to the junction 159 at one terminal of the direct current motor 138. The other motor terminal 161 is connected through a pair of parallel circuits, each connected between the anode and cathode of one of the silicon controlled rectifiers 155 and 156 to the respective high potential contacts 136 and 137. The silicon controlled rectifiers 155 and 156 are of the type previously described with reference to FIG. 6, hereinbefore. Resistors 164 and 165 of 33,000 ohms each, are respectively connected between the inputs of diodes 157 and 158 and the respective silicon controlled rectifiers 155 and 156 to act as triggers.

It will be seen that the presence of the silicon controlled rectifiers 155 and 156 in each of the circuits prevent any current from reaching the motor 138 unless conductor 105 has a positive bias relative to conductors 103 and 104. (See FIG. 18.)

Referring to FIG. 19B, the narrow contactors 136 and 137 are respectively connected through the anode and cathode electrodes of respective silicon controlled rectifiers 168 and 169 to junction 171 at one terminal of the motor 139. Junction 172 at its other terminal is connected through parallel circuits, each including conventional rectifying diodes 175, 176 to the conducting contacts 135a and 135b on contacting member 135. Contacting areas 135a and 135b are each connected to the negative terminal of a respective rectifying diode 179, 180, the other terminals of each of which are respectively connected through a rectifying diode 183, 184 to trigger the silicon controlled rectifiers 168, 169. 33,000 ohm resistors 185, 186 are respectively connected between the junctions of pairs of diodes 179 and 183, and 180 and 184, respectively and the anodes of the silicon controlled rectifiers 168, 169.

In FIG. 19A, it will be noted that when the left-hand side of bar 135 has a positive bias, the gate on the silicon controlled rectifier 155 will be triggered, thus allowing the circuit containing motor 138 to be active. Referring back to FIG. 17, it will be seen that rheostat 109 controls the load comprising motor 138. When the bar 135 has a negative bias, the left-hand portion of the circuit indicated in FIG. 19B will be active and resistor 110 (FIG. 17) will control the action of motor 139. It will be noticed that due to the positioning of the contacts, only conductors 103 and 105 (FIG. 18) are involved. Conductors 103 and 105 thus carry the current which controls the two motors 138 and 139, which are located in the same vehicle, 2, of FIG. 1.

Figure 20B:
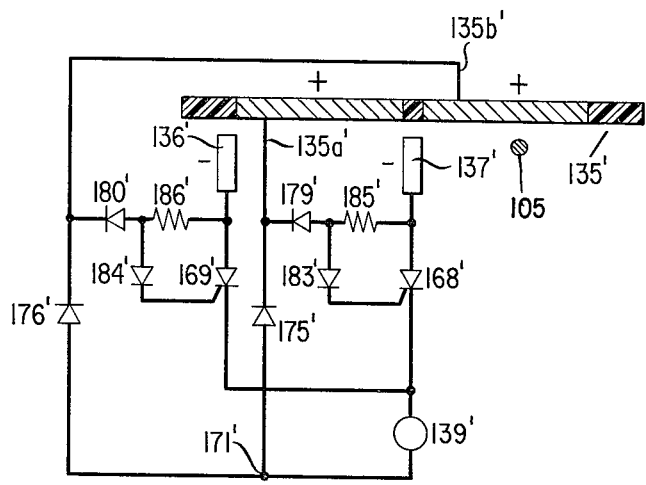
FIGS. 20A and 20B are corresponding circuits of opposite polarity to FIGS. 19A and 19B for vehicle 2.
Figure 20A:
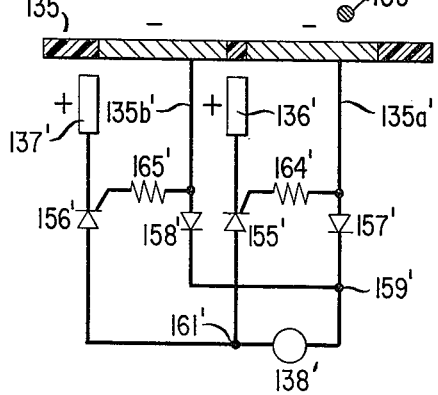

The circuits for the second vehicle, 2, of FIG. 1, are the mirror image of those for the first vehicle, 1, as shown in FIGS. 20A and 20B, primed numbers corresponding to those of FIGS. 19A and 19B. Briefly, resistor 111 controls the action of motor 138' and resistor 112 controls that of motor 139'. Conductors 104 and 105 (FIG. 18) carry the current which flows through motors 138' and 139', both of which are located in the second vehicle, 2.

Figure 21:
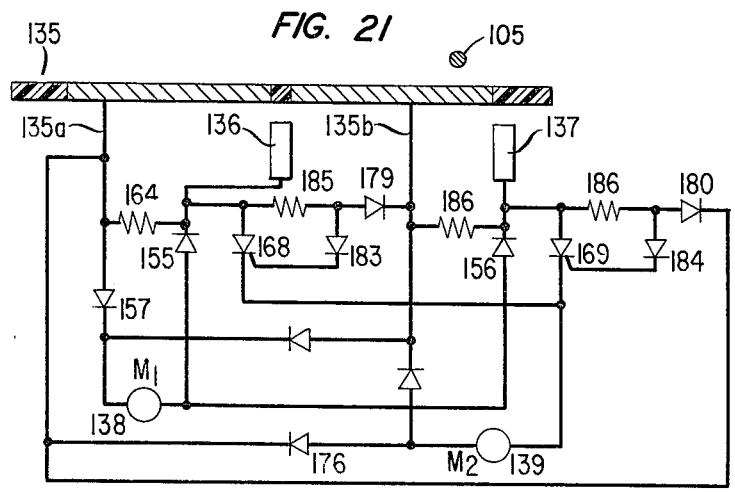
FIG. 21 is the combined circuit for vehicle 1, including the circuits of FIGS. 19A and 19B.

FIG. 21 combines the circuits of FIGS. 19A and 19B, as actually installed in vehicle 1. A similar mirror image circuit is installed in vehicle 2.

It should be mentioned here that the circuit concepts presented with reference to FIGS. 19A, 19B, 20A, 20B and 21 can be extended to allow for an arbitrary number of channels to be used. For example, to obtain N channels one would have 2N resistors replacing the four resistors 109, 110 and 111, 112 of FIG. 17. This involves N/2 resistor pairs: $R_1$ and $R_2$, $R_3$ and $R_4$, $R_5$ and $R_6$, etc. One also would require N/2 lower conductors in the track system in addition to the one elevated conductor 105. The bar contact 135 would now be broken into N/2 conducting segments; and, the point contacts per vehicle would equal N/2. Finally, the circuits of FIGS. 19A, 19B, 20A and 20B would be expanded to repeat the basic silicon controlled rectifier, diode, resistor pattern N/2 times.

The present invention is not restricted to any of the specific embodiments, the specific track configurations or any of the specific circuit elements shown herein by way of example, but only by the scope of the appended claims. For example, the system is not limited to the model vehicle system, such as the disclosed embodiments, but the principles of the invention may be applied to any remotely controlled vehicle system.

What is claimed is:

1. In a remotely controlled vehicle system comprising in combination at least one electrically powered vehicle including driving means which is continuously energized from a remote source of power through oppositely polarized contacts, track means comprising a repetitive pattern of conductors superimposed along a surface on which said vehicle travels, and including:

a first set comprising a plurality of said conductors uniformly spaced apart on said surface, a second set comprising conducting means interposed between and electrically isolated from successive conductors of said first set along said surface, the conductors of said first set and the second conducting means being connected to opposite terminals of said remote source of power for oppositely polarizing said first set relative to said second set, first and second contacting means fastened on said vehicle in circuit relation to opposite terminals of said driving means, said contacting means constrained to move relative to said vehicle only in a direction substantially normal to the surface of said track, said first contacting means connected to one said terminal comprising a contacting surface constructed to make slidable electrical contact with one or more conductors of said first set simultaneously without making electrical contact with the intervening conducting means of said second set, and said second contacting means connected to the other said terminal, constructed to make slidable electrical contact with the intervening conducting means of said second set without being electrically responsive to the conducting means of said first set, each of said second contacting means so disposed relative to said first contacting means that when said first contacting means is in contact with one or more conductors of said first set at least one of said second contacting means is in contact with the intervening conducting means of said second set.

2. A vehicle system in accordance with claim 1 wherein said track means comprises a repetitive pattern of substantially parallel conductors superimposed on a substantially plane surface and extending in a principal direction of travel of the vehicle, and said first set comprises a plurality of said conductors uniformly spaced apart in a lateral direction on said surface and elevated at a substantially uniform height above said surface, and said second set comprises conducting means interposed between successive conductors of said first set along said surface and substantially depressed in height relative to the conductors of said first set, the elevated conductors of said first set and the second depressed conducting means being connected to opposite terminals of said remote source of power for oppositely polarizing said first set relative to said second set, said first and second contacting means fastened to the bottom of said vehicle in circuit relation to opposite terminals of said driving means, said contacting means constrained to move relative to said vehicle only in a direction substantially normal to the surface of said track, said first contacting means connected to one said terminal comprising an extended contacting surface disposed to contact at least two of the elevated conductors of said first set simultaneously without making contact with the depressed conducting means of said second set, and said second contacting means comprising one or more narrow members connected to the other said terminal, said narrow members shaped to fit between the elevated conductors of said first set and to make contact with the depressed conducting means of said second set, each of said narrow second contacting means so disposed relative to said extended first contacting means that when said extended first contacting means is in contact with a pair of the elevated conductors of said first set at least one of said narrow second contacting means is in contact with the depressed conducting means of said second set.

3. A vehicle system in accordance with claim 2 wherein said first contacting means is elongated in one dimension for contacting two of said elevated conductors simultaneously, and said second narrow contacting means comprises spring mounted contactors constructed to move over said elevated conductors making electrical contact only with said depressed conducting means.

4. A vehicle system in accordance with claim 2 in which said first contacting means comprises an elongated bar mounted so that it extends transversely across the bottom of said vehicle contacting at least two of said elevated conductors simultaneously.

5. A vehicle system in accordance with claim 2 in which said first contacting means comprises an annular circular or elliptical surface having an inner radius which at least exceeds the separation between two of said raised conductors.

6. The combination in accordance with claim 1 wherein said remote source supplies alternating current power, and said system comprises a plurality of vehicles each having a pair of said contacting means, control means connected to said alternating current source and including means to separately regulate signals of opposite phase imposed between said first conductors and said second conducting means on said track, a first motor circuit connected between said contacting means in one of the vehicles on said track responsive to unidirectional signals of one phase to drive a first one of said motors, and a second motor circuit connected between said contacting means in one of the vehicles on said track responsive to unidirectional signals of the opposite phase to drive a second one of said motors, whereby the driving speed of said first and second motors are separately controlled from said control means.

7. The combination in accordance with claim 6 wherein said system includes two vehicles, and one of said vehicles comprises a driving circuit including at least one motor responsive to signals from said control means of said one phase, and the other vehicle comprises a driving circuit including at least one motor responsive to signals from said control means of the opposite phase, whereby each said vehicle includes driving means responsive to a separately regulated signal from said source.

8. The combination in accordance with claim 7 wherein the driving circuit in each of said vehicles comprises at least two motors in an electrical circuit responsive to unidirectional voltage signals from said control circuit, means for triggering at least one of said two motors in one said vehicle to operate in the same or a different voltage range than that in which the other said motor operates, one of said motors connected to drive one of the driving wheels of said vehicle and the other of said motors connected to drive the other driving wheel of said vehicle, whereby the direction of said vehicle is determined by the relative speeds of said motors which speeds are a function of the magnitude of the unidirectional voltage signal from said control circuit.

9. The combination in accordance with claim 8 wherein said means for triggering at least one said motor includes an avalanche breakdown rectifier.

10. The combination in accordance with claim 8 wherein said control means for separately regulating signals of opposite phase from said alternating current source includes additional circuit means for imposing a voltage spike on each of said unidirectional control signals of opposite phase and for varying the position of each of said spikes in the time cycles of said oppositely phased signals directed to separate vehicles, driving circuits responsive to unidirectional signals of opposite phase respectively connected between the contactors of each of said two vehicles, the circuits in each of said vehicles including a first and second motor in substantially parallel relation, said first motor responsive to operate at substantially low voltage between said contactors, and a trigger circuit in each of said circuits connected to trigger operation of the second motor in said circuit in response to one said voltage spike in the unidirectional voltage signal received by said circuit from said control circuit, whereby depending on the position of the spike in the time cycle of said signal, the second said motor operates at a speed which is faster, equal to or slower than the speed of said first motor, thereby controlling the direction of said vehicle.

11. A control circuit in accordance with claim 10 for separately regulating signals of opposite phase from said alternating current source includes additional circuit means for imposing a voltage spike on each of said control signals and for imposing the control signals including the voltage spike between said elevated conductors and said depressed conducting means on said track, said circuit including in combination:

a transformer circuit connected to receive the alternating current voltage from said source, means comprising a pair of center taps connected to said transformer circuit at points of equally disposed potential above and below the ground or neutral potential of said source, each of said taps connected through a variable resistor and an oppositely directed rectifier to one of the two output terminals of said control circuit for providing to said terminals separately controlled voltage signals corresponding to the positive and negative portions of the signal from said source, an additional pair of taps connected to the voltage extremities of said transformer, each of said taps connected through a variable resistor circuit to charging means, said charging means connected to trigger the operation of an avalanche breakdown rectifier, the output of each said avalanche breakdown devices connected to said respective terminals for imposing a spike of corresponding polarity on the voltage output derived from said terminal at a point in the alternating current cycle corresponding to the triggering of said avalanche breakdown rectifier.

12. A vehicle system in accordance with claim 8 wherein each of said vehicles has a unidirectional circuit having a first motor $M_1$ and a second motor $M_2$, each in circuit relation across said contactors to receive current from said source of power through said raised conductors and said conducting means on said track, a first trigger circuit and a second trigger circuit, said first trigger circuit disposed in shunt relation to said first motor $M_1$ across said contactors, said second trigger circuit disposed in series relation to said second motor $M_2$ across said contactors, each of said trigger circuits including a potential divider across said contactors for operating said trigger circuits at a preselected voltage, the resistance values of the said respective potential dividers arranged so that below a preselected voltage $V_1$ neither of said trigger circuits is operative, at an intermediate voltage range between $V_1$ and $V_2$ only said second trigger circuit is operative, and above the preselected upper voltage $V_2$, both said trigger circuits are operative, whereby below voltage $V_1$ only the motor $M_1$ is operative, in the range between $V_1$ and $V_2$ both motors $M_1$ and $M_2$ are operative, and in the range above $V_2$ only motor $M_2$ is operative.

13. In a vehicle system in accordance with claim 7, a tandem control circuit for separately regulating signals of respectively opposite phase from said alternating current source and for imposing the control signals between said elevated conductors and said depressed conducting means on said track, said circuit including:

a transformer connected to receive the alternating current voltage signals from said source, means comprising a pair of center taps connected to said transformer circuit at points equally disposed above and below the ground or neutral potential of said source, each of said taps respectively connected through an avalanche breakdown rectifier in series with a first variable resistor to opposite terminals connected between said elevated conductors and said depressed conducting means on said track, a charging circuit including a second variable series resistor and a capacitor connected from each said center tap for triggering the avalanche breakdown rectifier in the circuit of opposite polarity, whereby the first said variable resistor controls the frequency of pulses to the respective motors interposed across the conductors of said track and the second said variable resistor controls the magnitude of said pulses.

14. The combination in accordance with claim 2 wherein said remote source supplies alternating current power, and said system comprises a plurality of vehicles each having a pair of said contacting means, control means connected to said alternating current source and including means to separately regulate signals of opposite phase imposed between said elevated conductors and said second conducting means on said track, a first motor circuit connected between said contacting means in one of the vehicles on said track response to unidirectional signals of one phase to drive a first one of said motors, and a second motor circuit connected between said contacting means in one of the vehicles of said track responsive to unidirectional signals of the opposite phase to drive a second one of said motors, whereby the driving speed of said first and second motors are separately controlled from said control means.

15. The combination in accordance with claim 14 wherein the depressed conducting means included in the track of said system comprises a first and a second parallel, separately insulated conducting strip between each pair of elevated conductors, said control means consisting of a ground or neutral connection between said alternating current source and said set of elevated conductors, and a pair of separate oppositely poled variable resistance connections between the high potential terminal of said alternating current source and each of said separately insulated depressed conducting strips, said system consisting of two said vehicles, two said motor circuits in each of said two vehicles respectively responsive to oppositely phased signals from said control means, each of said model vehicles having a first motor connected to one wheel and a second motor connected to an opposite wheel, each of said motors connected in a unidirectional circuit of opposite polarity disposed between said first contacting means and said second contacting means, said first contacting means in each said vehicle constructed and arranged to contact said raised conductors without coming in contact with said depressed conduction means, and said second contacting means in each said vehicle constructed and arranged to contact only a corresponding one of said depressed conducting strips, the circuit of each of said motors including in series therewith a trigger circuit constructed to become conducting at a preselected voltage imposed between said first and second contacting means, the amplitude of oppositely phased voltages imposed across each said circuit being under control of variable resistance means between the high potential terminal of said alternating current source and a corresponding set of said depressed conducting strips.

16. The combination in accordance with claim 15 wherein each said trigger circuit comprises a controlled solid state avalanche breakdown rectifier, means connected to said avalanche breakdown rectifier in shunt across the terminals of each said motor for triggering operation of said avalanche breakdown rectifier at a preselected voltage.

17. The combination in accordance with claim 15 in which said model vehicle circuit comprises at least N model vehicles, each having two motor circuits respectively responsive to oppositely phased signals from said control circuit, said track depressed conducting means comprises N parallel, separately insulated conducting strips between each said pair of elevated conductors, and said control circuit comprises N pairs of oppositely poled unidirectional circuits connected in parallel between the high potential terminal of said alternating current source and a corresponding set of said depressed conducting strips, each of said N circuits comprising variable resistance means, and wherein the second contacting means in each said vehicle is constructed to contact only a depressed strip belonging to its corresponding set of N sets of strips.

18. In a model vehicle system which includes a track having at least two conducting means connected to opposite terminals of a source of power, at least one model vehicle having contactors engaging opposite terminals of said conducting means, a control circuit connected to said source of power constructed to impose across said conducting means at least one unidirectional voltage signal, said control circuit including means manipulable to impose a spike on said voltage signal at progressively different positions in the time cycle of said voltage signal, the driving circuit of said vehicle comprising a first and a second motor in electrical circuit relation between said contactors, said first motor responsive to the voltage signal from said control circuit to operate at a substantially low voltage, a trigger circuit responsive to one of the spikes imposed on the voltage signal from said control circuit to trigger operation of said second motor, whereby depending on the position of the spike in the time cycle of said signal, the second said motor operates at a speed which is faster, equal to or slower than the speed of said first motor, thereby controlling the direction of said vehicle.

19. The combination in accordance with claim 18 wherein said source is of alternating current, means connected to said control circuit for separately regulating signals of opposite phase from said source, dual additional means manipulable to impose a voltage spike at progressively different positions on each of the signals of opposite phase from said source, said system comprising two model vehicles each having a driving circuit responsive to a signal of opposite phase from said control circuit, and each said driving circuit comprising a first and a second motor in circuit relation between said contactors, each of the first said motors of said two vehicles responsive to voltage signals of respectively opposite phase from said control circuit to operate at substantially low voltages, a trigger circuit connected to the second said motors in each of said vehicles and responsive to a spike imposed on the voltage signal of appropriate polarity from said control circuit to trigger operation of the second motor in the corresponding vehicle, whereby depending on the position of the spike in the time cycle of the voltage signals of each phase, the second said motor in each of said vehicles operates at a speed which is faster, equal to or slower than the speed of the respective first motor in said vehicle, thereby controlling the direction of each of said vehicles.

20. The combination in accordance with claim 19 wherein in each of said vehicles one said motor is connected in series with resistance means across said contactors and the other said motor is connected across said contactors in series with an avalanche breakdown rectifier, and a triggering circuit is connected to said avalanche breakdown rectifier and is responsive to said voltage spike to render said avalanche breakdown rectifier conducting.

21. A model vehicle system which includes a track having at least two conducting means connected to opposite terminals of an alternating current source of power and one or more vehicles having contactors constructed to engage said two conducting means, each said vehicle including a circuit responsive to a unidirectional voltage signal from said source, a first motor $M_1$ and a second motor $M_2$ connected in each said circuit for independently driving opposite wheels of said vehicle, said first motor $M_1$ connected in normally operating condition across said contactors, a first avalanche breakdown rectifier connected in shunt relation across said first motor $M_1$, said second motor $M_2$ connected in series with a second avalanche breakdown rectifier across said contacts, a triggering circuit connected between said contacts to trigger conduction of said second avalanche breakdown rectifier in response to a relatively low voltage signal $V_1$ across said contacts, a triggering circuit connected between said contacts to trigger conduction of said first avalanche breakdown rectifier in response to a relatively higher voltage signal $V_2$ across said contacts, whereby below voltage $V_1$ neither of said valanche breakdown rectifiers is conducting, motor $M_1$ is operative and motor $M_2$ is inoperative, between voltage $V_1$ and $V_2$ the second said avalanche breakdown rectifier is conducting and both motors $M_1$ and $M_2$ are operating, and above voltage $V_2$ both said avalanche breakdown rectifiers are conducting, motor $M_1$ is shunted out, and motor $M_2$ is operating.

22. The method of operating a model vehicle system including a track having two sets of conductors connected to opposite terminals of a control circuit across a source of power, and including at least one model vehicle having a receiving circuit with two motors connected in circuit relation between a pair of contacts engaging opposite track terminals, each said motors being connected independently to operate one of the wheels of said vehicle, which includes the steps of:

imposing at least one unidirectional control voltage signal across said track terminals, interposing a voltage spike on said control voltage signal at progressively different positions in the time cycle of said signal, operating the first motor in the receiving circuit of said vehicle at a speed which is a function of said control voltage signal, and initiating operation of the second motor in the receiving circuit of said vehicle in response to the position of said voltage spike in said control signal, whereby, depending on the position of the spike in the time cycle of said control signal, the second said motor operates at a speed which is faster, equal to, or slower than the speed of said first motor.

23. The method in accordance with claim 22 wherein said source is of alternating current, and said system comprises at least two model vehicles each having a receiving circuit responsive to an oppositely phased unidirectional voltage signal, the steps of:

separately interposing voltage spikes on each of said control signals at progressively different positions in the time cycles of each of said control signals, operating the first motors in the receiving circuits of said vehicles at speeds which are the functions of the respectively phase control voltage signals, and initiating operation of the second motors in the receiving circuits of each of said vehicles in response to the position of the voltage spike in the control signal of corresponding phase, whereby, depending on the position of the spike in the time cycle of the voltage signals of each phase, the second motor in each said circuit operates at a speed which is faster, equal to, or slower than the speed on the first motor in said vehicle.

* * * * *